United States Patent Office

3,763,060
Patented Oct. 2, 1973

3,763,060
STARCH XANTHATE-POLYAMIDE-POLYAMINE INTERPOLYMER PAPER STRENGTH ADDITIVES
George Earle Hamerstrand, Peoria, and Merle E. Carr, Chillicothe, Ill., assignors to the United States of America as represented by the Secretary of Agriculture
No Drawing. Filed June 9, 1972, Ser. No. 261,496
Int. Cl. C08b 25/02
U.S. Cl. 260—9        6 Claims

ABSTRACT OF THE DISCLOSURE

Crosslinked starch-polyamide-polyamine interpolymers are prepared and described. Wet- and dry-tensile, dry-burst, and concora crush strengths of paper products, prepared from both acid and alkaline pulp furnishes, are significantly increased by the wet-end addition of the interpolymers.

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This invention relates, generally, to improvements in papermaking. More specifically, it relates to novel crosslinked starch-polyamide-polyamine interpolymer compositions and the methods of their use as paper-strength improving additives.

The large consumption and wide variety of paper products has created a great need for continuing efforts in the field of chemical additives which will impart various physical properties to the paper products. Among the more important of the strength improving chemical additives are the synthetic or starch-derived cationic polymers, oxidatively crosslinked starch xanthates (U.S. 3,160,552), and starch polyethyleniminothiourethane (U.S. 3,436,305) which is made by reacting starch xanthate with polyethylenimine. There are several strength factors, which must be considered when producing paper products, that include wet- and dry-tensile and dry-burst strengths, crush resistance, tear factor, fold endurance, and pick resistance. Most of the prior art additives will improve either the wet strength or certain of these dry strength properties, sometimes at the expense of other properties. One problem that often occurs is low retention of the additives, which then end up in the white water creating a removal problem.

Surprisingly, therefore, we found compositions that greatly increase a wide range of both wet- and dry-strength properties, with retentions as high as 98%. In accordance with the invention, the improvement in the production of paper products comprises incorporation into the paper products as wet-end additives from about 0.125% to about 1% by dry pulp weight of a polyamide-polyamine-epichlorohydrin resin and from about 0.5% to about 2.5% by dry pulp weight of starch xanthate. These two additives react to form interpolymers having either ionic or covalent crosslinks. The interpolymers can be produced and incorporated in the papermaking pulp furnish by either in situ or ex situ procedures.

In addition to the improvements in strength properties, the above additives have the advantage of being operative in a pH range of from 5 to 10, which encompasses the pH range of, essentially, all paper pulp furnishes. The high degree and wide range of benefits that are imparted to paper by these additives are exceptionally suitable for various types of paper including newsprint, useful for offset printing, and linerboard.

DETAILED DESCRIPTION OF THE INVENTION

Sodium starch xanthate is a derivative of starch having the following formula:

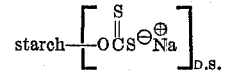

where D.S. (degree of substitution) is the number of xanthate groups per anhydroglucose units (AGU) in starch. Sodium starch xanthates, having D.S. values of from 0.01 to 3, have been prepared and are useful as starting materials for preparation of the compounds of the instant invention. However, xanthate D.S. values of from 0.05 to 0.5 are most readily prepared [Swanson et al., Ind. Eng. Chem., Prod. Res. Develop. 3(1): 22 (1964)] and are, therefore, preferred for our purpose.

The polyamide - polyamine - epichlorohydrin resin (PAE) starting material can be any of the products described in U.S. Pat. 2,926,154. The PAE used in the examples was shown by nuclear magnetic resonance (NMR) and elemental analyses to be a polymer having the following repeating unit:

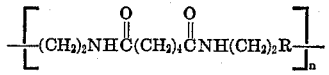

where R equals the following substituents in the approximate ratios of 3:1:1:

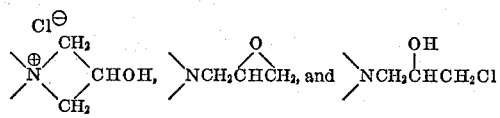

and $n$ equals from about 65 to about 130 based on a unit weight of 300 and a molecular weight range of 20,000–40,000. The chain length and the number of —R— groups in the PAE repeating unit above will vary according to the dicarboxylic acids and the polyalkylamines used in the preparation of the PAE.

Reactions between sodium starch xanthate and PAE result in two different products depending on reaction conditions. The most important of these conditions are reaction time and the ratio of PAE repeating units to starch xanthate groups which are present in the reaction mixture.

When aqueous solutions of PAE are added dropwise to aqueous solutions of sodium starch xanthate, precipitation occurs at PAE to sodium starch xanthate weight ratios of from about 0.24 to 1 to about 0.67 to 1, depending primarily on pH of the reaction mixture, concentrations of the aqueous solutions of reactants, and D.S. of sodium starch xanthate. Products from these reactions have a ratio of PAE repeating units to xanthate groups of from about 1:1 to about 3:1. The above ratio will be known herein as PAE:Stx and is defined as the ratio of the number of PAE repeating units (i.e.,

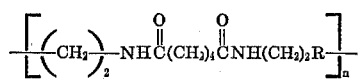

supra) to the number of starch xanthate groups (i.e.,

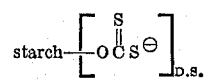

ionic bond).

Sodium starch xanthate (0.13 D.S., 0.50% by weight solution) reacted with PAE (0.01% by weight solution) at pH 5 to form a precipitate having a PAE:Stx of about 1:1. Reactions conducted in the same manner at pH 9 resulted in products having a PAE:Stx of about 1.5:1.

In other words, increasing pH increases the amount of PAE per sodium starch xanthate required to form the precipitate. Decreasing sodium starch xanthate concentration has the same effect. A 0.13 D.S. sodium starch xanthate at a concentration of 0.01% reacted with PAE (0.01% by weight soltuion) at pH 5 to give a precipitate having a PAE:Stx of about 1.9:1. Precipitates were produced in good yield at pH values from 5 to 10. Reaction temperatures of from 5° to 45° C. had little effect on reaction efficiency.

Utilizing NMR, elemental, and infrared (IR) analyses, along with a study of model compound reactions, it was shown that the precipitated product is a polysalt interpolymer having the following repeating unit:

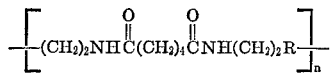

where $n$ equal from about 65 to about 130;

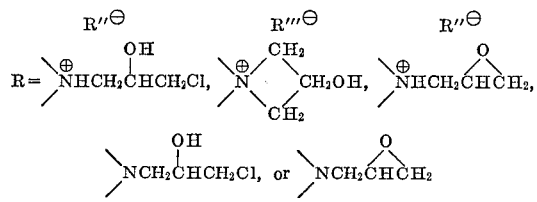

$R'''^{\ominus} = Cl^{\ominus}$ or $R''^{\ominus}$; $R''^{\ominus}$ = starch xanthate having a xanthate group D.S. of from 0.01 to about 3 and having the following structure:

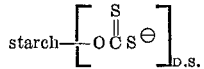

and the ratio of R to xanthate groups is from 1:1 to about 3:1.

In the above reaction the polysalts precipitate in good yields as long as the proper amounts of reactants are completely combined within less than 10 minutes. When the reaction mixture contains less PAE than that required to cause precipitation, so that the PAE and sodium starch xanthate remain in solution, a second type of reaction occurs. For example, solutions containing PAE and sodium starch xanthate in about a 0.33:1 weight ratio, analyzed after 5 minutes by ultraviolet spectroscopy (UV), showed a maximum at 305 mμ, equal in intensity to a control sodium starch xanthate solution. After about 10 to 15 minutes the maximum at 305 mμ had decreased by about 1% and another absorption appeared at 280 mμ, characteristic of a starch xanthate ester structure. This means that an approximately 1% reaction occurred between the starch xanthate and the PAE, giving a product having a ratio of PAE repeating unit to starch xanthate ester group of 100:1. The above ratio will be known as PAE:StxE and is defined as the ratio of the number of PAE repeating units (supra) to the number of starch xanthate ester groups (i.e.,

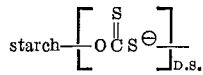

covalent bond). After 1 hour about 50% of the xanthate had reacted, and the maxium reaction of 75% occurred within about 4 hours.

In this manner products were obtained which, as shown by UV analysis and model compound studies, were crosslinked interpolymers having the following repeating units:

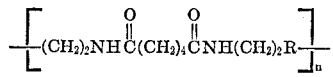

where $n$ equals from about 65 to about 130;

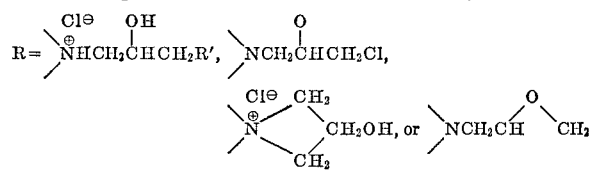

R' is a starch xanthate ester having a xanthate ester D.S. of from about 0.1 to about 3 and having the following structure:

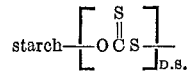

and the ratio of R:R' is from about 100:1 to about 1.5:1. When the above-described interpolymers are added to or produced in the presence of paper pulp slurries, paper products are obtained which have increased wet and dry strength over similar products having no additives. Furnishes incorporated with interpolymers were converted into handsheets, linerboard, and newsprint which were prepared and tested according to TAPPI standards: forming and testing handsheets, T 205 os–71 and T 220 os–71; breaking length (tensile strength), T 456 os–68 and T 404 ts–66; burst factor, T 403 ts–63; concora crush resistance, T 808 os–71 and T 809 os–71; tear strength, T 414 ts–65; and ring crush resistance, T 472 su–68 (Standards and Suggested Methods, Technical Association of the Pulp and Paper Industry).

Additions of sodium starch xanthate, alone, at levels as high as 2.5% o.d. (i.e., based on weight of oven dried pulp fibers) had, essentially, no effect on paper strengths. PAE, alone, at levels of 0.125 to 0.5 had, essentially, no effect on any dry strength properties in newsprint, but PAE levels of 0.125 to 1% in linerboard increased all strength properties except tear strength. However, under all conditions and all levels of addition, which were in accordance with the invention, the combination of PAE and sodium starch xanthate imparted to the paper products greater strength than did PAE alone. The exception to this was the quality of wet-tensile strength which was, essentially, the same for the combination as it was for PAE alone. Dry strength (tensile, burst, and concora crush) increases with increasing levels of addition of PAE and sodium starch xanthate. Paper products prepared from furnishes having pH values in the range of 5 to 9 show little significant difference in wet strength but some differences in dry strength.

Some differences in strength properties were found when the addition order of the two polymers to the pulp furnish was altered. The least satisfactory results occurred when PAE and starch xanthate were allowed to react together outside of the furnish (i.e., ex situ) for a period of 24 hours. Paper products prepared by these methods had considerably better strength properties than paper prepared with PAE as the only additive. The additive, prepared by reacting PAE and sodium starch xanthate for 30 minutes before addition to the furnish (ex situ), gave a paper with excellent strength properties. The best and preferred procedure is a sequential addition procedure in which PAE is added to the furnish prior to the addition of sodium starch xanthate.

In actual paper machine runs, additions can be made at any wet-end position including the headbox. Papers produced by these procedures from pulp furnishes in which contact times for PAE and sodium starch xanthate were from 2 to 30 minutes, exhibited, essentially, no differences in strength properties.

When furnishes were treated with only sodium starch xanthate, we found that almost no starch xanthate was retained in the paper. Retention in linerboard as high as 95% occurred when sodium starch xanthate was added at the 1% o.d. level to a pH 5 furnish containing 0.5% o.d. PAE. Newsprint, prepared from pH 7 pulp furnishes containing 0.5% PAE and 0.5% sodium starch xanthate, retained 98% of the latter component. Using the preferred method of addition and levels of addition of 0.125% to 0.5% o.d. PAE and 0.25% to 0.5% o.d. sodium starch xanthate, newsprint was prepared which had strength properties that were as good or better than high-test grade, commercially prepared newsprint.

Sodium starch xanthates, used as paper additives in the examples, had D.S. values ranging from about 0.05 to about 0.25, but sodium starch xanthates having D.S. values as high as 3 are considered to be equivalent for the purposes of this invention. Also, any PAE as described above is considered to be equivalent to the PAE used in the examples.

The following examples are intended only to further illustrate the invention and should not be construed as limiting the scope of the invention.

Examples 1–7

PAE: A 10% by weight aqueous stock solution of a polyamide-polyamine-epichlorohydrin resin, Kymene 557 (Hercules, Inc., Wilmington, Del.), having a molecular weight range of 20,000–40,000, was diluted with distilled water to 1.0% by weight solids concentration and used as such in all examples.

Sodium starch xanthate: Commercial pearl corn starch was converted to sodium starch xanthate to D.S. levels of 0.05, 0.13, and 0.25 by the method of Swanson et al., Ind. Eng. Chem., Prod. Res. Develop. 3(1), 22 (1964), diluted with distilled water to a 10% by weight sodium starch xanthate solids concentration stock solution, and stored at 34° C. until used for examples.

Polysalt precipitation: 1 g. of the sodium starch xanthate stock solution was diluted with distilled water to from 0.01% to 0.5% sodium starch xanthate concentration, kept at 25° C., and the pH was adjusted to 5, 7, or 9 with 0.1–1.0 N hydrochloric acid. The 1.0% by weight solution of PAE was admixed dropwise, over a 2-minute period, with each of the diluted solutions of sodium starch xanthate until a precipitate formed. The precipitate was filtered; washed successively with distilled water, ethanol, acetone, and ether; stored at 23° C., 50% relative humidity; and analyzed for volatiles, yield, nitrogen (Perkin-Elmer 240 Elemental Analysis), sulfur [White, Mikrochim. Acta 807 (1962) after 24 hours storage], and chlorine, Table 1.

half the amount required for precipitation), was added dropwise to the solution of sodium starch xanthate and thoroughly mixed in 1 minute. A 10-ml. portion of the reaction mixture was immediately removed, diluted to 0.01% sodium starch xanthate concentration, and analyzed by UV spectroscopy, after 5 minutes, for xanthate and xanthate ester concentration; absorptions at 305 nm. and 280 nm. respectively. Other 10-ml. portions of the reaction mixture were removed at 15 minutes, 1 hour, and 4 hours and analyzed in the same manner. The 5-minute sample exhibited a maximum absorption at 305 nm. equal in intensity to a control solution of sodium starch xanthate. Samples removed at 15 minutes, 1 hour, and 4 hours exhibited absorptions at 305 nm. which had decreased in intensities by 1%, 50%, and 75%, respectively. Proportional increases in absorption at 280 nm. were observed showing a conversion of xanthate to xanthate esters. On the basis of this data, it was calculated that the products formed after 15 minutes, 1 hour, and 4 hours had PAE:StxE of about 100:1, 2:1, and 1.5:1, respectively.

The above reaction was repeated at pH 5, 9, and 10 with sodium starch xanthate concentrations of 0.01% and 0.1% by weight. The only difference in observed results were some changes in reaction rate.

Example 10

Example 9 was repeated with 7.28 ml. of a 1.0% by weight solution of PAE. After 4 hours reaction time, UV analysis of a 10-ml. portion of the reaction mixture showed that 30% of the xanthate had been converted to xanthate ester corresponding to a product having a PAE:StxE of 1.5:1.

Example 11

Example 9 was repeated with 21.84 ml. of a 1.0% by weight solution of PAE. After 1 hour reaction time, UV analysis of a 10-ml. portion of reaction mixture showed that 55% of the xanthate had been converted to xanthate ester corresponding to a product having a PAE:StxE of 1.8:1.

Example 12

To a 1000-g. pulp furnish (15 g., dry basis, unbleached, Kraft pulp in 985 ml. of tap water; 560 Canadian Standard freeness), under good agitation, was added 37.5 g. of an aqueous solution of sodium starch xanthate at 1% concen-

TABLE 1

| Example | Sodium starch xanthate D.S. | Percent by wt. concentration | Wt. ratio required for PPT[1] parts PAE/part Stx pH 5 | pH 7 | pH 9 | PAE:Stx of product pH 5 | pH 7 | pH 9 | Yield,[2] percent | [N][2] percent | [S][2] percent |
|---|---|---|---|---|---|---|---|---|---|---|---|
| 1 | 0.13 | 0.01 | 0.427 | 0.583 | 0.668 | 1.9 | 2.6 | 2.9 | | | |
| 2 | 0.13 | 0.05 | 0.273 | 0.364 | 0.410 | 1.7 | 1.6 | 1.8 | | | |
| 3 | 0.13 | 0.10 | 0.273 | 0.342 | 0.392 | 1.2 | 1.5 | 1.7 | 97 | 3.3 | 3.6 |
| 4 | 0.13 | 0.20 | 0.264 | 0.334 | 0.364 | 1.2 | 1.5 | 1.6 | 98 | 3.3 | 3.6 |
| 5 | 0.13 | 0.50 | 0.250 | 0.327 | 0.346 | 1.1 | 1.4 | 1.5 | | | |
| 6 | 0.05 | 0.20 | | 0.240 | | | 2.7 | | | | |
| 7 | 0.25 | 0.20 | | 0.599 | | | 1.6 | | | | |

[1] PPT = Polysalt precipitation.
[2] Based on a product obtained at pH 7.

Example 8

Same as Example 2 at pH 5 except that reaction temperatures were varied. At 5° C. the weight ratio required for precipitation was 0.32 part PAE per part sodium starch xanthate; at 25° C., the ratio was 0.27:1; and at 45° C., the ratio was 0.29:1.

Example 9

One gram of sodium starch xanthate stock solution (10.0% by weight solids, D.S. 0.13) was diluted with distilled water to 0.05% by weight solid, kept at 25° C., and adjusted to pH 7 with 0.1 to 1.0 N hydrochloric acid. PAE solution, 18.2 ml. of a 1.0% by weight solid (onetration (0.375 g., dry basis). The pH was then adjusted to 7.0 with 1 N hydrochloric acid, and 3.75 g. of a solution of PAE at 1% concentration (0.0375 g., dry basis) were added (mixed 3 minutes). Levels of PAE and sodium starch xanthate were 0.25% and 2.5%, dry pulp basis, respectively. The mixture was diluted to 0.35% consistency; pH was adjusted to 7.0; and handsheets (127 g./m.[2], dry basis) were prepared and tested according to TAPPI standards, supra. Control sheets were prepared with no additives, 2.5% of sodium starch xanthate but no PAE, 0.25% of PAE but no sodium starch xanthate, 2.5% of pearl corn starch, and 2.5% pearl corn starch plus 0.25% PAE, Table 2.

TABLE 2

| Additive, percent o.d. | Tensile strength breaking length, m. | | Burst factor, (g./cm.²)/ (g./m.²) | Concora crush strength, lbs. |
|---|---|---|---|---|
| | Wet | Dry | | |
| Control, no additives | 140 | 6,550 | 50 | 60 |
| Control, 2.5% sodium starch xanthate | 175 | 6,670 | 49 | 61 |
| Control, 0.25% PAE | 1,400 | 7,750 | 61 | 67 |
| Control, 2.5% pearl corn starch | 180 | 7,400 | 60 | 67 |
| Control, 2.5% pearl corn starch plus 0.25% PAE | 1,130 | 7,980 | 65 | 70 |
| 2.5% sodium starch xanthate plus 0.25% PAE | 980 | 8,230 | 66 | 74 |

Example 13

Example 12 was repeated, except for the method of addition of PAE and sodium starch xanthate. PAE (0.25% o.d.) and sodium starch xanthate (2.5% o.d.) were mixed ex situ in the same amounts as in Example 12, were allowed to react for 30 minutes, and the reaction mixture was added to the pulp furnish. A second mixture was reacted identically, allowed to stand for 24 hours, and added to the furnish. In a third method PAE and sodium starch xanthate were added sequentially to the furnish in the same amounts as in Example 12, PAE being added first. Handsheets were prepared from the three furnishes and tested as in Example 12, Table 3.

TABLE 3

| Method of addition | Tensile strength breaking length, m. | | Burst factor, (g./cm.²)/ (g./m.²) | Concora crush strength, lbs. |
|---|---|---|---|---|
| | Wet | Dry | | |
| Ex situ, 30 minutes | 1,173 | 9,315 | 71 | 79 |
| Ex situ, 24 hours | 575 | 8,725 | 58 | 73 |
| Sequential, PAE followed by sodium starch xanthate | 1,400 | 9,460 | 76 | 82 |

Example 14

Linerboard was prepared on a 32-inch width, pilot, Fourdrinier paper machine from unbleached wester, softwood, sulfate pulp, which was refined to 560–580 Canadian Standard freeness. Furnish consistency (chest, stock pump, and claflin, located in increasing proximity to the headbox) was 2.5%, diluted just ahead of the fan pump to 0.5%, and diluted to 0.35% at the headbox. The furnish was maintained at pH 7.

PAE (0.5% o.d.) and sodium starch xanthate (1.0% o.d.) additions and wet-end contact times were by the following procedures:

(1) PAE added to the chest then sodium starch xanthate to the claflin, contact time 2 minutes;
(2) PAE added to the chest then sodium starch xanthate to the chest, contact time 30 minutes;
(3) PAE added to the chest then sodium starch xanthate to the stock pump, contact time 2 minutes;
(4) PAE added to the stock pump then sodium starch xanthate to the claflin, contact time 2 minutes;
(5) Sodium starch xanthate added to the chest then PAE to the claflin, contact time 2 minutes;

Control 1—no addition;
Control 2—PAE added to chest, no sodium starch xanthate.

The linerboards were tested according to TAPPI standards, supra, Table 4.

TABLE 4

| Procedure | Tensile strength breaking length, m. | | Burst factor, (g./cm.²)/ (g./m.²) | Starch xanthate retention, percent of amount added, o.d. |
|---|---|---|---|---|
| | Wet | Dry | | |
| Control: | | | | |
| 1 | 200 | 6,750 | 27 | |
| 2 | 1,720 | 8,370 | 36 | |
| 1 | 1,720 | 9,450 | 43 | 71 |
| 2 | 1,610 | 9,110 | 45 | 70 |
| 3 | 1,680 | 9,050 | 46 | 77 |
| 4 | 1,700 | 9,310 | 44 | 70 |
| 5 | 1,140 | 8,030 | 33 | 75 |

Example 15

Linerboard was prepared from the furnish described in Example 14. PAE (0.25% and 0.50% o.d.) and sodium starch xanthate (1% and 2% o.d.) were added to the furnish according to procedure 1, Example 14, and the amounts of starch xanthate retained in linerboard, at various furnish pH values, were determined, Table 5.

TABLE 5

| | Starch xanthate retention, percent of amount added, o.d. | | | | | |
|---|---|---|---|---|---|---|
| | 1% | | | 2% | | |
| Additive, percent o.d. | pH 5 | pH 7 | pH 9 | pH 5 | pH 7 | pH 9 |
| PAE 0.25 | 80 | 60 | 40 | 54 | 38 | 25 |
| PAE 0.50 | 94 | 71 | 48 | 53 | 33 | 32 |

Example 16

Linerboard was prepared according to procedure 1, Example 14 at an addition level for PAE of 0.5% o.d. and for sodium starch xanthate of 1% o.d. at furnish pH values of 5, 7, and 9. The paper products were tested according to TAPPI standards, supra, Table 6.

TABLE 6

| Properties | Additives, percent o.d. | | | | | | | |
|---|---|---|---|---|---|---|---|---|
| | None | | | PAE | | | PAE + starch xanthate | |
| | 0 | 0 | 0 | 0.5 | 0.5 | 0.5 | 0.5+1.0 | 0.5+1.0 |
| Furnish, pH | 5 | 7 | 9 | 5 | 7 | 9 | 5 | 7 9 |
| Burst factor, (g./cm.²)/(g./m.²) | 26 | 27 | 27 | 36 | 37 | 38 | 44 | 43 42 |
| Tensile strength breaking length, m.: | | | | | | | | |
| Dry | 6,500 | 6,600 | 6,615 | 8,190 | 8,150 | 7,995 | 9,100 | 9,240 8,905 |
| Wet | 200 | 700 | 200 | 1,635 | 1,800 | 1,820 | 1,645 | 1,760 1,825 |
| Tear factor g./(g./m.²) | 230 | 229 | 229 | 254 | 220 | 220 | 248 | 215 224 |
| Water absorptivity, Cobb test, g./m.² | 343 | 412 | 391 | 345 | 344 | 349 | 379 | 397 356 |
| Ring crush, lbs | 111 | 114 | 114 | 131 | 137 | 137 | 155 | 158 148 |

Example 17

Linerboard was prepared according to procedure 1, Example 14, at a furnish pH of 7 and varying addition levels of PAE and sodium starch xanthate. The paper products were tested by TAPPI standards, supra, Table 7.

TABLE 7

| Additive, percent o.d. | | Tensile strength breaking length, m. | | Burst factor, (g./cm.²)/ (g./m.²) | Concora crush strength, lbs. |
|---|---|---|---|---|---|
| PAE | Sodium starch xanthate | Wet | Dry | | |
| 0 | 0 | 200 | 6,100 | 27 | 50 |
| 0.125 | 0 | 1,100 | 7,215 | 32 | 57 |
| 0.125 | 1 | 1,060 | 7,800 | 36 | 62 |
| 0.25 | 0 | 1,360 | 7,670 | 35 | 64 |
| 0.25 | 1 | 1,340 | 8,450 | 39 | 70 |
| 0.50 | 0 | 1,800 | 8,150 | 37 | |
| 0.50 | 1 | 1,760 | 9,165 | 43 | 73 |
| 0.50 | 2 | 1,740 | 9,360 | 44 | 82 |
| 1.0 | 1 | 2,100 | 8,645 | 39 | 57 |
| 1.0 | 2 | 2,200 | 9,815 | 49 | 96 |

Example 18

A furnish of repulped, unprinted, commercial newsprint was pulped 1 hour at 22° C., 6% consistency, and pH 7. PAE and sodium starch xanthate were added according to procedure 1, Example 14, at levels of 0.125% and 0.5% o.d. (PAE) and 0.25% and 0.5% o.d. (sodium starch xanthate). The products were tested for strength properties (TAPPI standards, supra): porosity (T 460 os–68), opacity (T 425 m–60), brightness (T 452 m–58), smoothness (T 479 su–71), Dennison wax pick candle number (T 459 su–65), and compared to similar data determined from the analysis of high-test grade and low-test grade commercially prepared newsprint, Table 8.

TABLE 8

| Properties | Additive, percent | | | | | Commercial newsprint | |
|---|---|---|---|---|---|---|---|
| | None | PAE | | PAE plus starch xanthate | | High test | Low test |
| | 0 | 0.125 | 0.5 | 0.125+0.25 | 0.5+0.5 | | |
| Burst factor (g./cm.²)/(g./m.²) | 10 | 10 | 10 | 12 | 13 | 10.5 | 3.5 |
| Breaking length, m.: | | | | | | | |
| Dry | 3,700 | 3,650 | 3,815 | 4,250 | 4,410 | 4,177 | 2,084 |
| Wet | 215 | 455 | 870 | 530 | 945 | 734 | 183 |
| Tear factor, g./(g./m.²) | 63 | 66 | 63 | 68 | 55 | 45 | 34 |
| Folding endurance (MIT double fold) | 22 | 24 | 24 | 42 | 70 | 28 | 3 |
| Porosity, sec./100 cc | 64 | 59 | 64 | 80 | 77 | 45 | 20 |
| Opacity, percent | 94 | 94 | 94 | 95 | 94 | 93 | 98 |
| Brightness, percent | 56 | 56 | 56 | 56 | 55 | 58 | 55 |
| Smoothness, 8 plies, sec./50 cc | 54 | 56 | 60 | 98 | 78 | 52 | 48 |
| Dennison wax pick, candle number: | | | | | | | |
| Wire | 8 | 8 | 9 | 10 | 12 | 11 | 3 |
| Felt | 8 | 9 | 10 | 11 | 13 | 11 | 3 |
| Retention, percent starch xanthate of amount added | | | | | 98 | | |

We claim:

1. A crosslinked interpolymer comprising the following repeating unit:

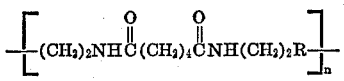

where $n$ equals from about 65 to about 130;

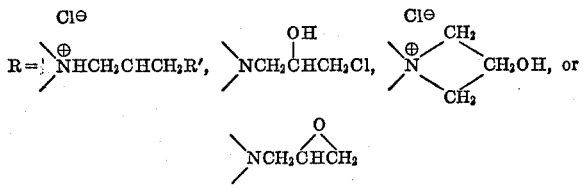

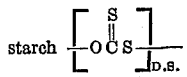

and where R' is a starch xanthate ester having a xanthate ester D.S. of from about 0.01 to about 3 and having the following structure:

$$\text{starch} \left[ -O\overset{S}{\underset{\parallel}{C}}S^{-} \right]_{D.S.}$$

and the ratio of R:R' is from about 100:1 to about 1.5:1.

2. A crosslinked interpolymer as described in claim 1 in which the ratio of R:R' is from about 10:1 to about 1.5:1.

3. A crosslinked interpolymer as described in claim 1 in which the ratio of R:R' is from about 4:1 to about 1.5:1.

4. A crosslinked interpolymer as described in claim 1 in which the xanthate ester D.S. is from about 0.05 to about 0.5.

5. A polysalt interpolymer comprising the following repeating unit:

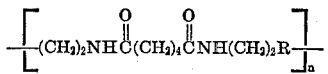

where $n$ equals from about 65 to about 130;

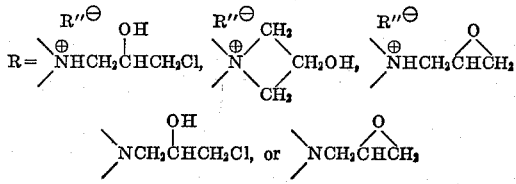

$R'''^{\ominus}=Cl^{\ominus}$ or $R''^{\ominus}$; $R''^{\ominus}$=starch xanthate having a xanthate group D.S. of from 0.01 to about 3 and having the following structure:

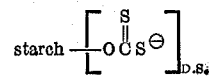

and the ratio of R to xanthate groups is from about 1:1 to about 3:1.

6. A polysalt interpolymer as described in claim 5 in which the xanthate D.S. is from about 0.05 to about 0.5.

References Cited

UNITED STATES PATENTS

| | | | |
|---|---|---|---|
| 2,926,154 | 2/1960 | Keim | 260—29.2 |
| 3,160,552 | 12/1964 | Russell et al. | 162—175 |
| 3,436,305 | 4/1969 | Mahar | 162—175 |
| 3,248,353 | 4/1966 | Coscia | 162—164 |
| 3,291,789 | 12/1966 | Bridgeford | 260—217 |
| 3,385,719 | 5/1968 | Lancaster et al. | 162—175 |
| 3,399,069 | 8/1968 | Bridgeford | 106—164 |
| 3,058,873 | 10/1962 | Keim et al. | 162—164 |
| 3,332,901 | 7/1967 | Keim | 162—164 |
| 3,335,023 | 8/1967 | Bridgeford | 260—217 |
| 3,531,465 | 9/1970 | Bridgeford | 106—164 |

WILLIAM H. SHORT, Primary Examiner

E. WOODBERRY, Assistant Examiner

U.S. Cl. X.R.

162—164, 168, 175